United States Patent
Lin

(10) Patent No.: US 10,316,919 B2
(45) Date of Patent: Jun. 11, 2019

(54) BUFFER STRUCTURE

(71) Applicant: Yu-Hsuan Lin, Changhua (TW)

(72) Inventor: Yu-Hsuan Lin, Changhua (TW)

(*) Notice: Subject to any disclaimer, the term of this patent is extended or adjusted under 35 U.S.C. 154(b) by 133 days.

(21) Appl. No.: 15/466,392

(22) Filed: Mar. 22, 2017

(65) Prior Publication Data

US 2018/0274617 A1 Sep. 27, 2018

(51) Int. Cl.
*F16F 1/377* (2006.01)
*F16F 1/373* (2006.01)
*B32B 3/26* (2006.01)

(52) U.S. Cl.
CPC ............ *F16F 1/377* (2013.01); *F16F 1/3737* (2013.01); *B32B 3/266* (2013.01); *Y10T 428/24273* (2015.01)

(58) Field of Classification Search
CPC ... Y10T 428/24273; F16F 1/377; B32B 3/266
See application file for complete search history.

(56) References Cited

U.S. PATENT DOCUMENTS

| | | | | |
|---|---|---|---|---|
| 4,673,605 A | * | 6/1987 | Sias | .................. A61G 7/05707 428/120 |
| 6,284,346 B1 | * | 9/2001 | Sheridan | .................. B32B 3/28 428/131 |

FOREIGN PATENT DOCUMENTS

TW           M525672 U      7/2016

* cited by examiner

*Primary Examiner* — William P Watkins, III
(74) *Attorney, Agent, or Firm* — Muncy, Geissler, Olds & Lowe, P.C.

(57) ABSTRACT

A buffer structure is provided, including a main body. The main body has a first face, a second face, and a predetermined thickness between the first face and the second face, the first face has a plurality of first holes, the second face has a plurality of second holes, and the plurality of first holes and the plurality of second holes are located within the predetermined thickness. Side walls of the plurality of first holes are integrally and continuously connected to side walls of the plurality of second holes.

10 Claims, 7 Drawing Sheets

BUFFER STRUCTURE

BACKGROUND OF THE INVENTION

Field of the Invention

The present invention relates to a buffer structure.

Description of the Prior Art

In order to prevent that an impulse of collision from damaging an object or making a people uncomfortable, a buffer structure is usually provided on a place that the object contacts another object (people). The conventional buffer structure is used on a seat of a bicycle, a chair pad, a shoe pad or a protective cover. Such buffer structure is adapted to a seat cushion structure disclosed in TWM525672.

In the prior art, the buffer structure is an elastic and ventilating supporting layer which is made through tangling of a fiber material. However, a product which is made through tangling of the fiber material has gaps in different dimensions, so a buffer effect is not even; and after the buffer structure is used for a while, the gaps are pressed to be tense and tight, so the buffer effect becomes unpreferable and accumulates heat easily.

The present invention has arisen to mitigate and/or obviate the afore-described disadvantages.

SUMMARY OF THE INVENTION

The major object of the present invention is to provide a buffer structure, which has holes uniquely designed and dispersed so that when the buffer structure receives a force, a side wall of the hole have an adequate space to deform to achieve a preferable buffer effect.

To achieve the above and other objects, a buffer structure is provided, including a main body. The main body has a first face, a second face, and a predetermined thickness between the first face and the second face, the first face has a plurality of first holes, the second face has a plurality of second holes, and the plurality of first holes and the plurality of second holes are located within the predetermined thickness. Side walls of the plurality of first holes are integrally and continuously connected to side walls of the plurality of second holes.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
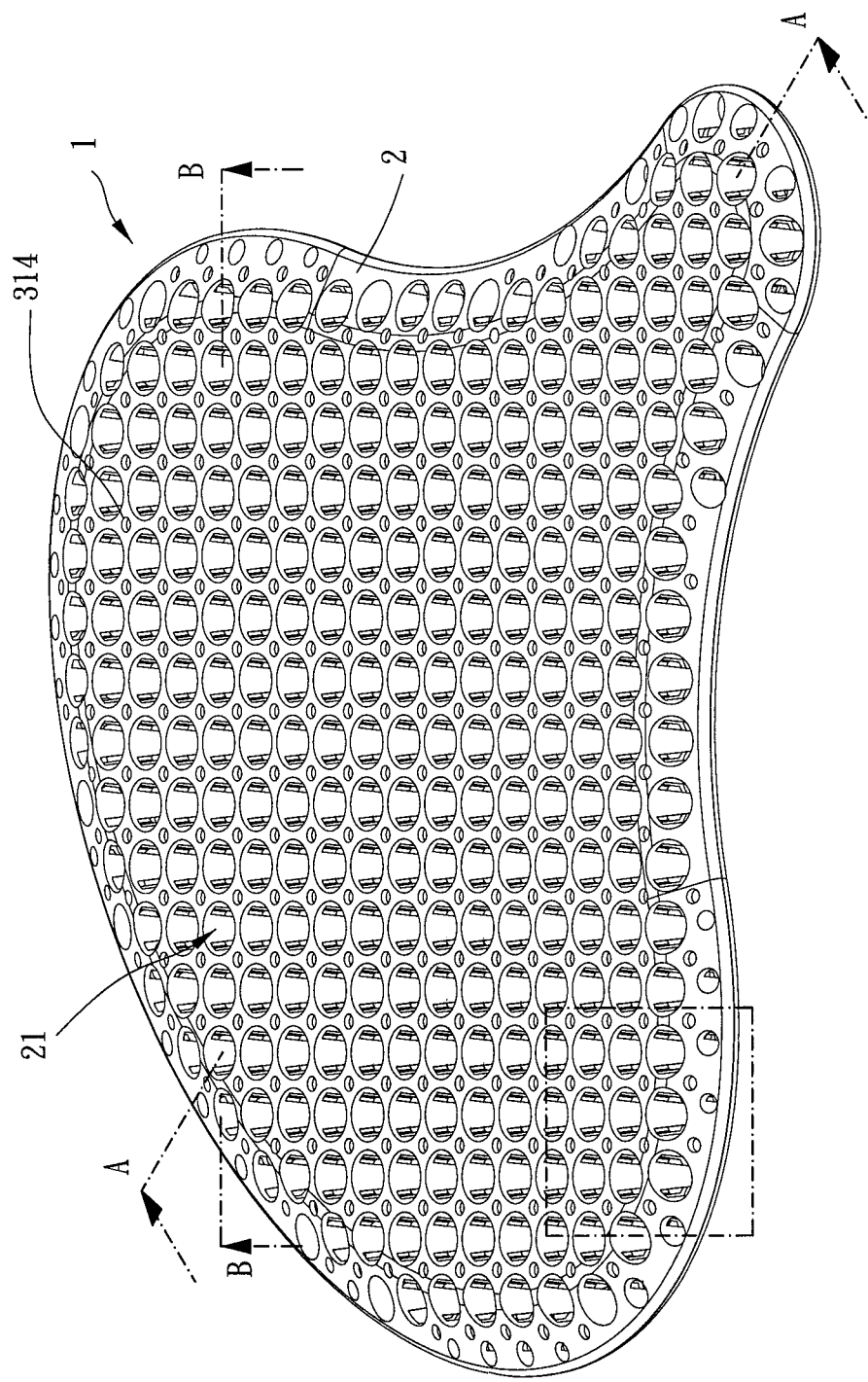
FIG. 1 is a stereogram of an embodiment of the present invention.
Figure 2:
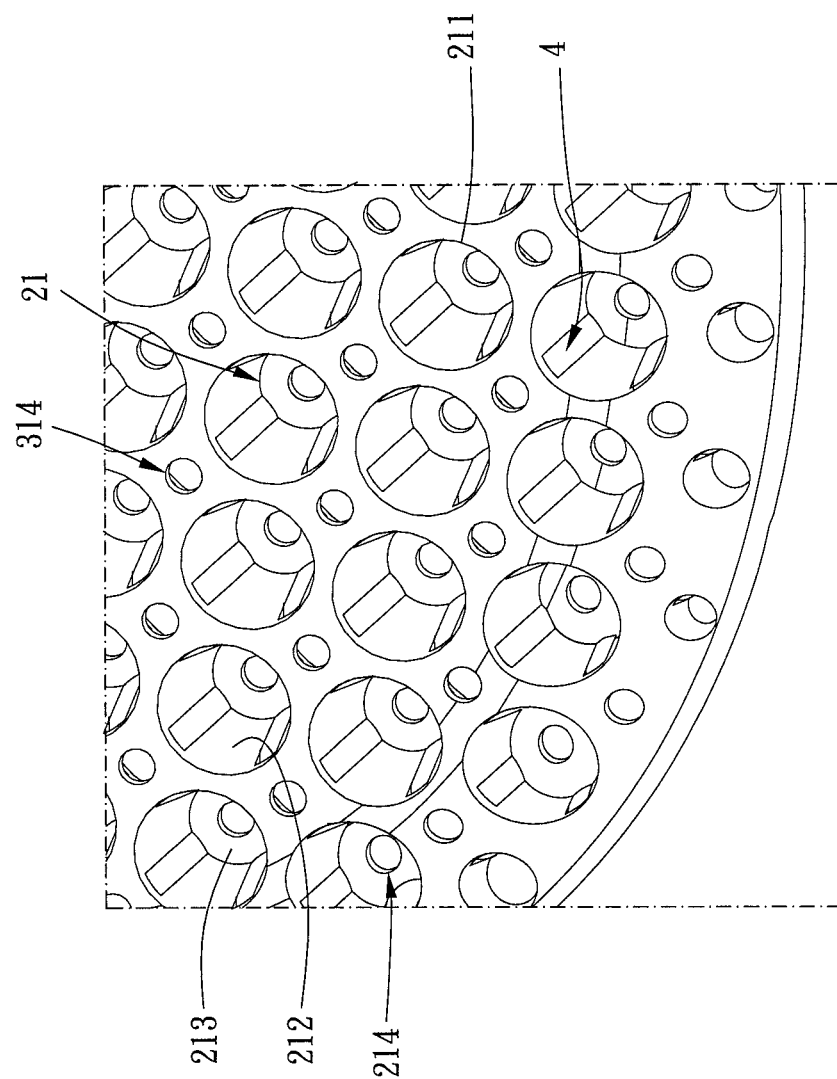
FIG. 2 is a partially-enlarged view of FIG. 1.
Figure 3:
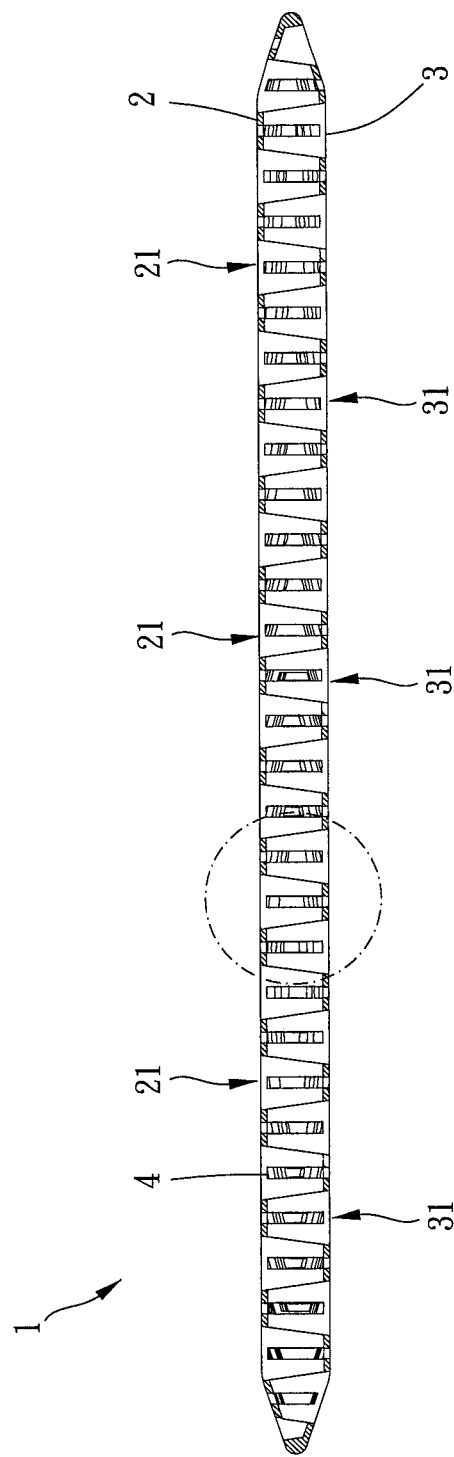
FIG. 3 is a cross-sectional view, taken along line A-A in FIG. 1.
Figure 4:
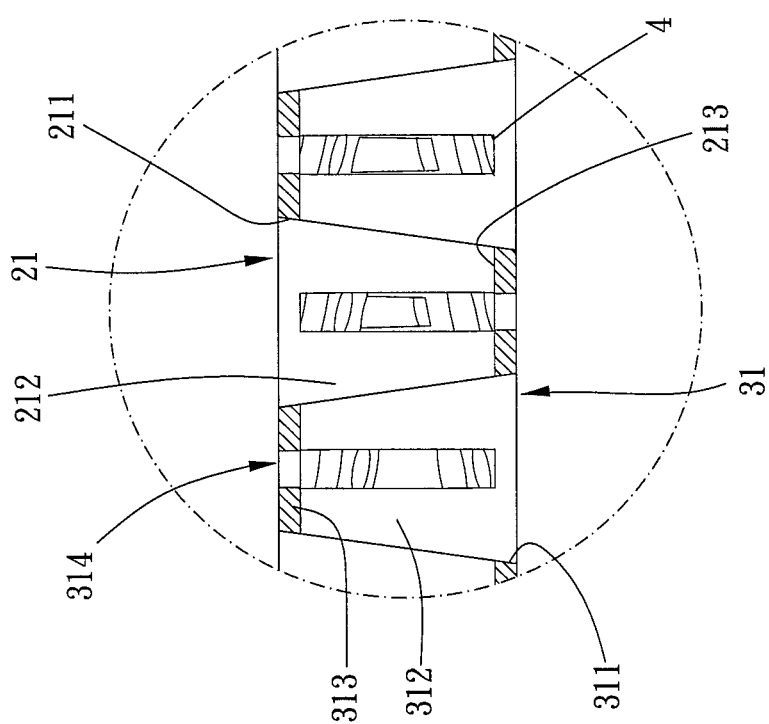
FIG. 4 is a partially-enlarged view of FIG. 3.
Figure 5:
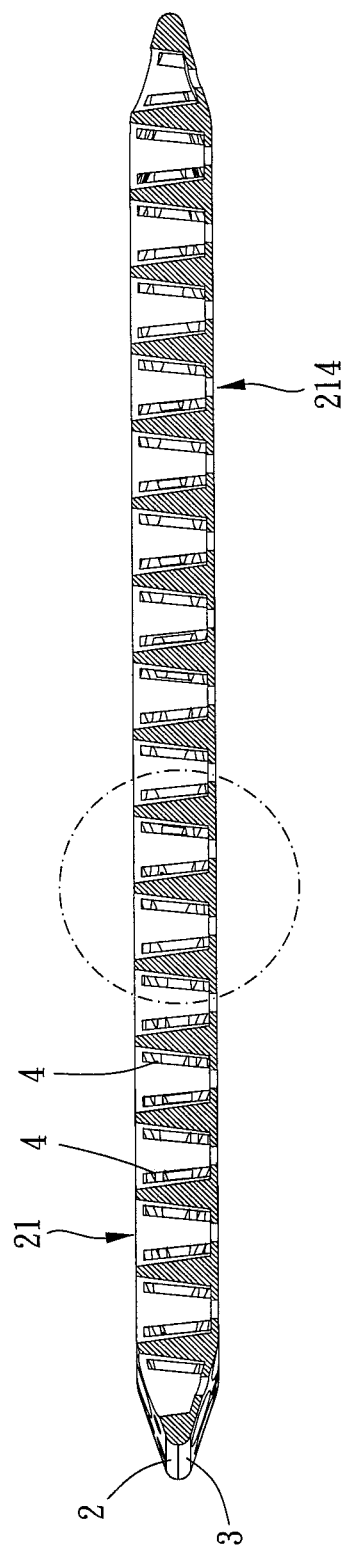
FIG. 5 is a cross-sectional view, taken along line B-B in FIG. 1.
Figure 6:
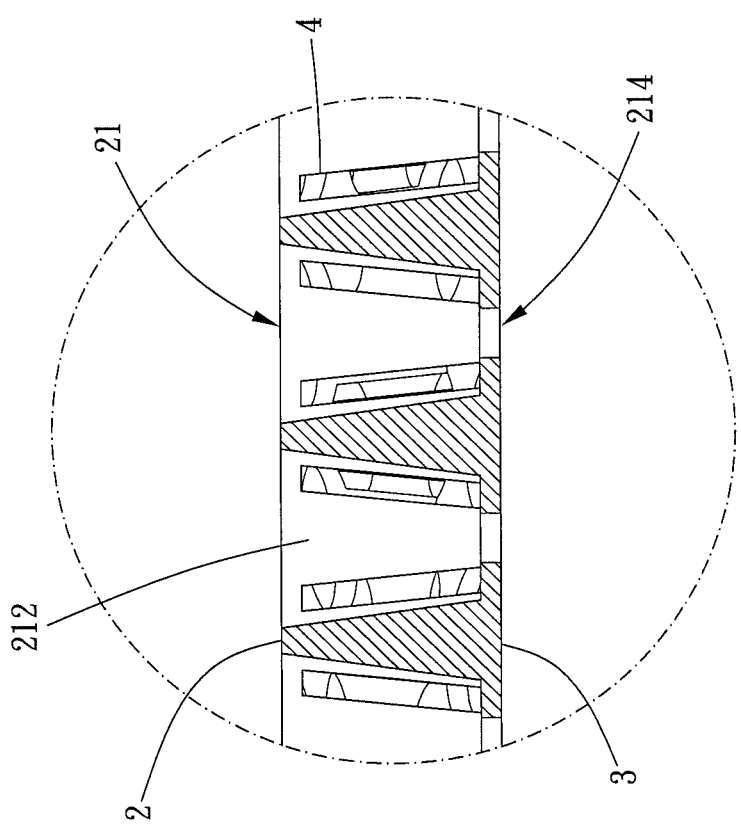
FIG. 6 is a partially-enlarged view of FIG. 5.
Figure 7:
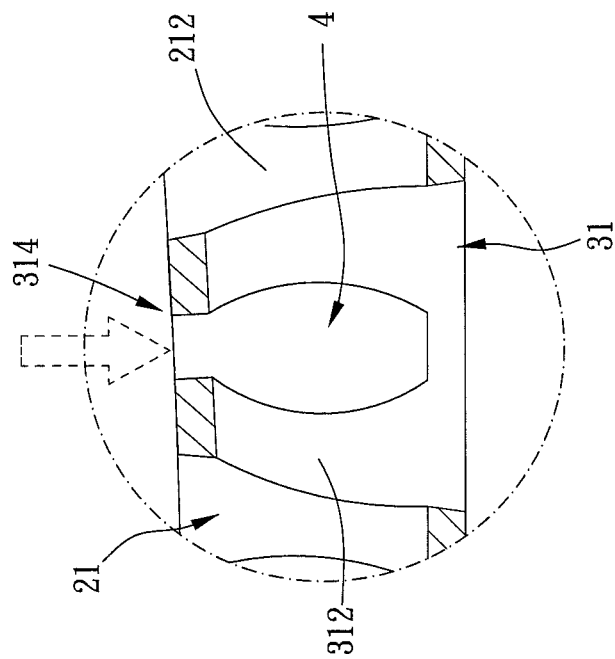
FIG. 7 is a partial view showing part of FIG. 2 with being pressed.
Figure 8:
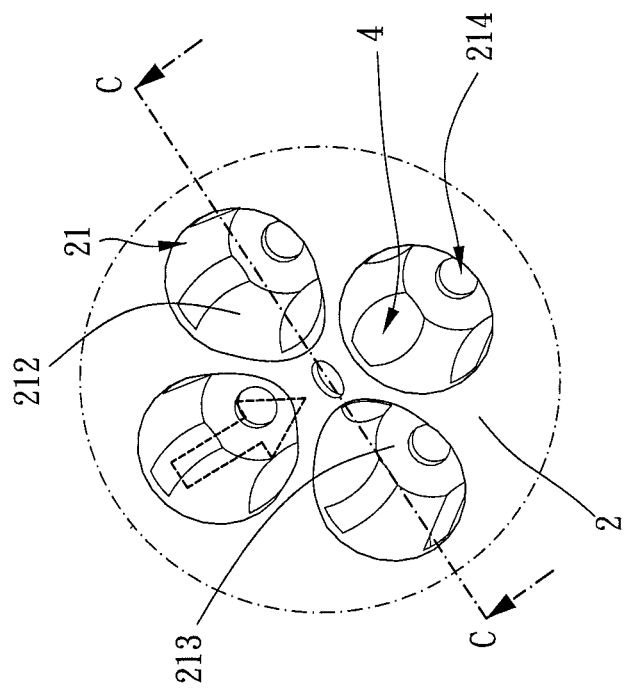
FIG. 8 is a cross-sectional view, taken along line C-C in FIG. 7.

Please refer to FIGS. 1 to 8 for an embodiment of the present invention. A buffer structure includes a main body 1.

Specifically, the main body 1 has a first face 2, a second face 3, and a predetermined thickness between the first face 2 and the second face 3, the first face 2 has a plurality of first holes 21, the second face 3 has a plurality of second holes 31, and the plurality of first holes 21 and the plurality of second holes 31 are located within the predetermined thickness. Side walls 212 of the plurality of first holes 21 are integrally and continuously connected to side walls 312 of the plurality of second holes 31. In other words, the side wall 212 of each of the plurality of first holes 21 is formed by a plurality of the side walls 312 of the plurality of second holes 31, and vise versa. Therefore, when receiving an external force (for example, an impact of collision, or a gravity of riding in a vehicle), the side walls 212, 312 which receive the force directly can transmit and split the force synchronously and quickly to prevent stress concentration.

More specifically, the main body 1 is made of a soft and flexible material (such as rubber), and the plurality of first holes 21 and the plurality of second holes 31 are staggeredly arranged so that the main body 1 has a substantially multi-grid staggered structure. When receiving the external force, the side walls 212 of the plurality of first holes 21 and the side walls 312 of the plurality of second holes 31 have sufficient space to deform so as to absorb vibration and buffer. Please further refer to FIGS. 7 and 8 for a more detailed partial structure. When the external force is applied to the first face 2, the side walls 212, 312 bend and deform toward a direction lateral to the external force and are in substantially a V shape which turn right in 90 degrees (like bending of human legs) so as to absorb and disperse the external force to buffer. In addition, when the external force is removed, the main body 1 can rebound to an initial state to provide buffer effect. Moreover, if a part of the side walls 212, 312 are broken, the other side walls 212, 312 of the multi-grid staggered structure can provide sufficient support to make sure that the plurality of first holes 21 and the plurality of second holes 31 have spaces for buffering.

It is to be noted that when the main body 1 is used with a sleeve member (for example, a leather sleeve) wrapped around, during a deformation process of the side walls 212, 312, the side walls 212, 312 will squeeze air in each of the plurality of first holes 21 and each of the plurality of second holes 31. When air is squeezed in a limited space, there will be a viscosity resistance due to fluid properties, and the buffer effect can be further enhanced.

Preferably, peripheries 211 of the plurality of first holes 21 and bottom walls 313 of the plurality of second holes 31 are integrally and continuously connected so that an overall structural strength can be enhanced and that the first face 2 has a more smooth surface to contact greater area of an object (for example, a bottom of a person) to disperse the force evenly and to provide buffer effect evenly. Similarly, peripheries 311 of the plurality of second holes 31 and bottom walls 213 of the plurality of first holes 21 are integrally and continuously connected.

Preferably, the main body 1 further includes a plurality of communicating slots 4, an opening direction of each of the plurality of communicating slots 4 is transverse to an opening direction of each of the plurality of first holes 21, and each of the plurality of communicating slots 4 communicates with ones of the first holes 21 and one of the second holes 31; therefore, air can circulate freely between the plurality of first holes 21 and the plurality of second holes 31 to increase permeability so as to quickly disperse heat and ensure a preferable comfort level. In this embodiment, each of the plurality of communicating slots 4 extends along the predetermined thickness and is elongated, so air in different depth can circulate simultaneously.

More preferably, the bottom wall 213 of each of the plurality of first holes 21 has a first through hole 214, the first through hole 214 communicates with the first hole 21 and outside, the bottom wall 313 of each of the plurality of second holes 31 has a second through hole 314, and the second through hole 314 communicates with the second hole 31 and the outside. It is understandable that the plurality of communicating slots 4 are for air to flow laterally therethrough, and the first and second through holes 214, 314 are for air to flow vertically therethrough so that air can circulate in many directions to provide a more preferable permeability.

In this embodiment, each of the plurality of first holes 21 and each of the plurality of second holes 31 are in a same shape and a same dimension, so when in actual use, the first face 2 and the second face 3 can provide the same buffer effect.

Specifically, the side wall 212 of one of the first holes 21 is connected to the side walls 312 of four of the second holes 31, each of the plurality of first holes 21 is tapered from the first face 2 toward the second face 3, each of the plurality of second holes 31 is tapered from the second face 3 toward the first face 2, and each of the plurality of first holes 21 and each of the plurality of second holes 31 are conical. In addition, each of the plurality of first through holes 214 and each of the plurality of second through holes 314 are round, and when the main body 1 is manufactured through injection molding, the round shape helps to demold smoothly.

More specifically, a ratio of a greatest radial dimension of an opening of each of the plurality of first holes 21 and a greatest value of the predetermined thickness is between 0.8 and 0.9, and a ratio of a diameter of the first through hole 214 and a diameter of an opening of the first hole 21 is between 0.2 and 0.4. It is to be noted that the first face 2 and the second face 3 may be not arranged in than parallel, and the first face 2 and the second face 3 may be not planes (may be randomly curved surfaces), so the determined thickness is variable.

Given the above, in the buffer structure, side walls of the plurality of first holes are integrally and continuously connected to side walls of the plurality of second holes so that the external force can be dispersed effectively and the structural strength can also be enhanced. In addition, with the communicating slot and the first and second through holes, air can flow smoothly between each of the plurality of first holes, each of the plurality of second holes and outside so that the buffer structure has a great permeability and comfort level.

While we have shown and described various embodiments in accordance with the present invention, it should be clear to those skilled in the art that further embodiments may be made without departing from the scope of the present invention.

What is claimed is:

1. A buffer structure, including:
   a main body, having a first face, a second face and a predetermined thickness between the first face and the second face, the first face having a plurality of first holes, the second face having a plurality of second holes, the plurality of first holes and the plurality of second holes being located within the predetermined thickness;
   wherein side walls of the plurality of first holes are integrally and continuously connected to side walls of the plurality of second holes;
   wherein each of the plurality of first holes is gradually enlarged from a bottom wall thereof to the first face and has a greatest radial dimension on the first face, and each of the plurality of first holes is communicated with all of ones of the plurality of second holes disposed therearound;
   wherein each of the plurality of second holes is gradually enlarged from a bottom wall thereof to the second face and has a greatest radial dimension on the second face, and each of the plurality of second holes is communicated with all of ones of the plurality of first holes disposed therearound.

2. The buffer structure of claim 1, wherein peripheries of the plurality of first holes and the bottom walls of the plurality of second holes are integrally and continuously connected.

3. The buffer structure of claim 2, wherein peripheries of the plurality of second holes and the bottom walls of the plurality of first holes are integrally and continuously connected.

4. The buffer structure of claim 1, wherein the plurality of first holes and the plurality of second holes are staggeredly arranged.

5. The buffer structure of claim 4, wherein the side wall of one of the first holes is connected to the side walls of four of the second holes.

6. The buffer structure of claim 1, wherein the bottom wall of each of the plurality of first holes has a first through hole, the first through hole communicates with the first hole and outside, the bottom wall of each of the plurality of second holes has a second through hole, and the second through hole communicates with the second hole and the outside.

7. The buffer structure of claim 1, wherein each of the plurality of first holes and each of the plurality of second holes are in a same shape and a same dimension, and a ratio of the greatest radial dimension of an opening of each of the plurality of first holes and a greatest value of the predetermined thickness is between 0.8 and 0.9.

8. The buffer structure of claim 1, wherein each of the plurality of first holes is tapered from the first face toward the second face, and each of the plurality of second holes is tapered from the second face toward the first face.

9. The buffer structure of claim 1, wherein the main body further includes a plurality of communicating slots, an opening direction of each of the plurality of communicating slots is transverse to an opening direction of each of the plurality of first holes, and each of the plurality of communicating slots communicates with ones of the first holes and one of the second holes.

10. The buffer structure of claim 3, wherein the plurality of first holes and the plurality of second holes are staggeredly arranged; the side wall of one of the first holes is connected to the side walls of four of the second holes; the bottom wall of each of the plurality of first holes has a first through hole, the first through hole communicates with the first hole and outside, the bottom wall of each of the plurality of second holes has a second through hole, and the second through hole communicates with the second hole and the outside; each of the plurality of first holes and each of the plurality of second holes are in a same shape and a same dimension, and a ratio of the greatest radial dimension of an opening of each of the plurality of first holes and a greatest value of the predetermined thickness is between 0.8 and 0.9; each of the plurality of first holes is tapered from the first face toward the second face, and each of the plurality of second holes is tapered from the second face toward the first face; the main body further includes a plurality of communicating slots, an opening direction of each of the plurality of communicating slots is transverse to an opening direction of each of the plurality of first holes, and each of the plurality of communicating slots communicates with ones of the first holes and one of the second holes; each of the plurality of first holes and each of the plurality of second holes are conical, each of the plurality of communicating slots extends along the predetermined thickness and is elongated, each of the plurality of first through holes and each of the plurality of second through holes are round, and a ratio of a diameter of the first through hole and a diameter of an opening of the first hole is between 0.2 and 0.4; the main body is made of a soft and flexible material; the main body is manufactured through injection molding.

\* \* \* \* \*